United States Patent [19]

Fisher

[11] 4,300,783
[45] Nov. 17, 1981

[54] CONVERTIBLE LOAD CARRYING-RIDE-ON VEHICLE

[75] Inventor: Robert C. Fisher, East Aurora, NY

[73] Assignee: The Quaker Oats Company, Chicago, Ill.

[21] Appl. No.: 114,278

[22] Filed: Jan. 22, 1980

[51] Int. Cl.³ .............................................. B62D 15/00
[52] U.S. Cl. .............................. 280/87.02 R; 46/201; 280/30; 280/47.37 R; 297/129; 297/217
[58] Field of Search ............ 280/1.11 R, 1.188, 87.01, 280/87.02 R, 30, 47.34, 47.37 R; 46/201, 202; 297/129, 193, 217

[56] References Cited

U.S. PATENT DOCUMENTS

| | | | |
|---|---|---|---|
| 1,203,831 | 11/1916 | Whittman | 280/87.01 X |
| 1,554,240 | 9/1925 | Strauss | 280/87.02 R |
| 2,706,643 | 4/1955 | Babcock | 280/47.37 R |
| 4,052,082 | 10/1977 | Jones et al. | 280/87.02 R |

FOREIGN PATENT DOCUMENTS 1117458  5/1956  France .............................. 280/47.34

Primary Examiner—Joseph F. Peters, Jr.
Assistant Examiner—Donald W. Underwood
Attorney, Agent, or Firm—Cumpston & Shaw

[57] ABSTRACT

A transportable body has side plates mounted thereon which are movable between box and seat positions. In the box position, the side plates cooperate with the body to form a box for converting the vehicle to a load carrying vehicle. Also, in this box position, an elongated handle member has one end pivotably connected to the body and extends outwardly therefrom for pulling the vehicle. In the seat position, the side plates cooperate with the body to form a seat for converting the vehicle to a ride-on vehicle. In this seat position, the handle member is coupled to and extends substantially at right angles to the body.

4 Claims, 6 Drawing Figures

CONVERTIBLE LOAD CARRYING-RIDE-ON VEHICLE

BACKGROUND OF THE INVENTION

1. Field of the Invention

The present invention relates generally to toys, and more particularly to a convertible load carrying-ride-on vehicle.

2. Description of the Prior Art

The prior art is replete with load carrying toys such as wagons, and ride-on toys of the type where a child sits on the toy and propells it with his feet. Such prior art, however, nowhere discloses or teaches a convertible toy wherein by modifying side plates and a handle member thereof, it is possible to selectively convert the toy into a load carrying vehicle or a ride-on vehicle.

SUMMARY OF THE INVENTION

In accordance with the present invention, a preferred embodiment of a convertible toy is disclosed. The toy in its broadest aspect comprises a transportable body and side plates mounted thereon. The side plates are movable between box and seat positions. In the box position, the side plates cooperate with the body to form a box for converting the vehicle to a load carrying vehicle. In the seat position, the plates cooperate with the body to form a seat for converting the vehicle to a ride-on vehicle.

In another aspect of the invention, the side plates comprise a pair of elongated plates of L-shaped cross-section. Each plate is pivotably mounted about its longitudinal axis along a longitudinally extending corner of the body, and is pivotally movable between the box and seat positions.

In still another aspect of the invention the toy has an elongated handle member comprising a tongue and handle at one end thereof. Means are provided on the toy body for coupling the handle member thereto in pull and steer positions depending upon whether the toy is converted to a load carrying or ride-on vehicle respectively. In the pull position, the opposite end of the tongue is pivotably connected to the body and the tongue and handle extend outwardly transverse to the front unit for pulling the load carrying vehicle. In the steer position, a portion of the tongue is coupled to the body so that the tongue and handle extend substantially at right angles to the body.

In a more specific aspect of the invention, the coupling means between the handle member and body comprises a vertically extending opening in the front unit. The opening has a vertically extending groove along its inner periphery for receiving a laterally extending lug on the tongue of the handle member when it is slid into the opening to its steer position. The front unit further has a notch connected to the upper end of the opening for receiving the tongue when the handle member is withdrawn to the upper end of the opening and then pivoted into the notch to its pull position.

The invention and its advantages will become more apparent from the detailed description of the invention presented below.

BRIEF DESCRIPTION OF THE DRAWING

In the detailed description of the invention presented below, reference is made to the accompanying drawing, in which.

DETAILED DESCRIPTION OF THE INVENTION

Figure 1:
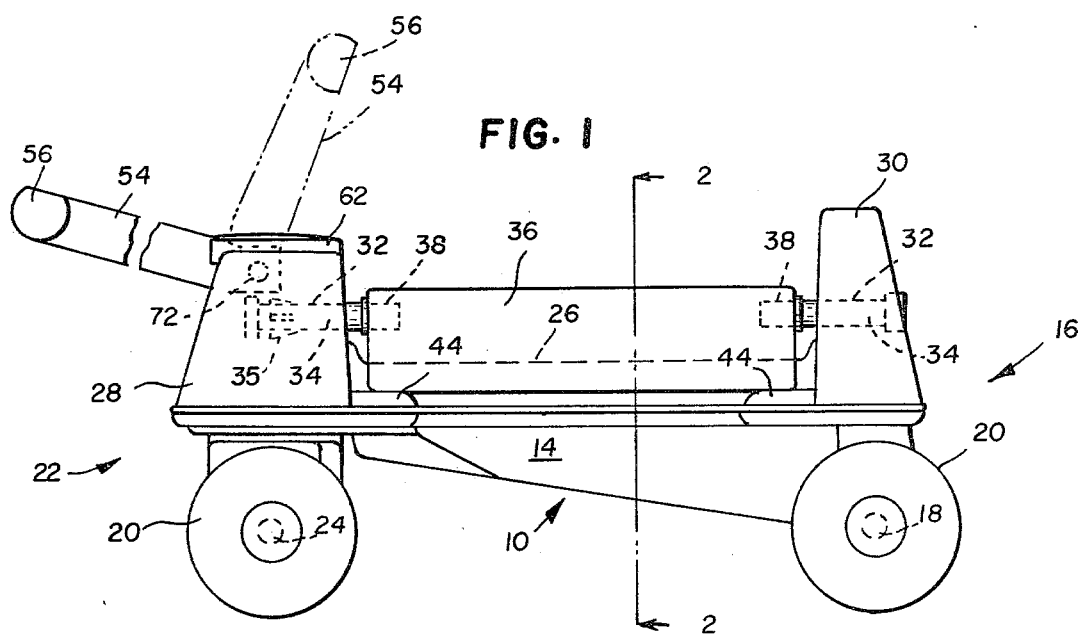
FIG. 1 is a side elevational view of the convertible load carrying-ride-on vehicle of this invention shown as a load carrying vehicle.
Figure 2:
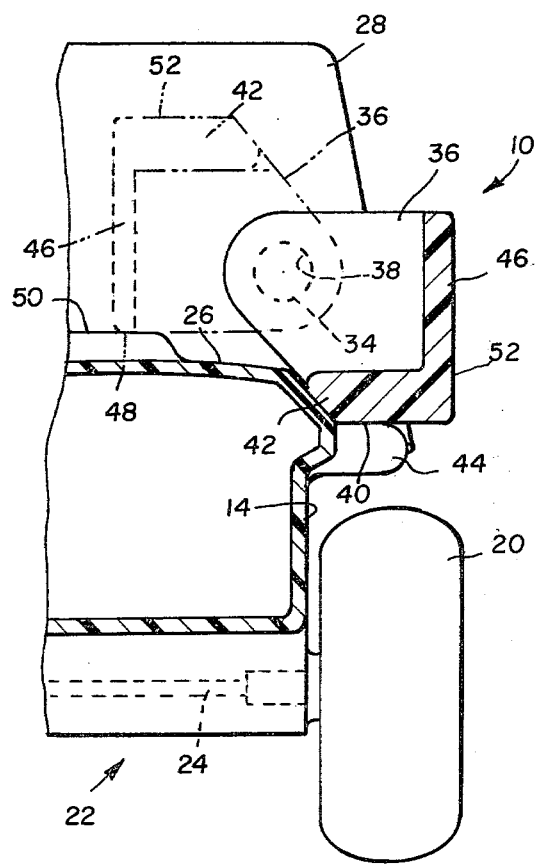
FIG. 2 is a section view taken substantially along line 2—2 of FIG. 1.
Figure 3:
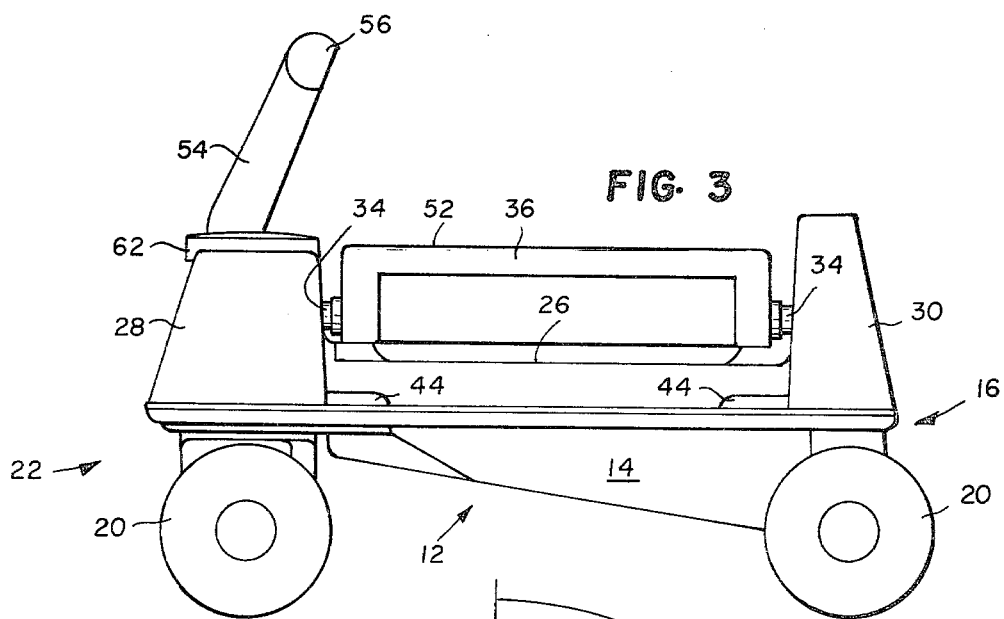
FIG. 3 is a side elevational view similar to FIG. 1 showing the vehicle converted to a ride-on vehicle.
Figure 6:
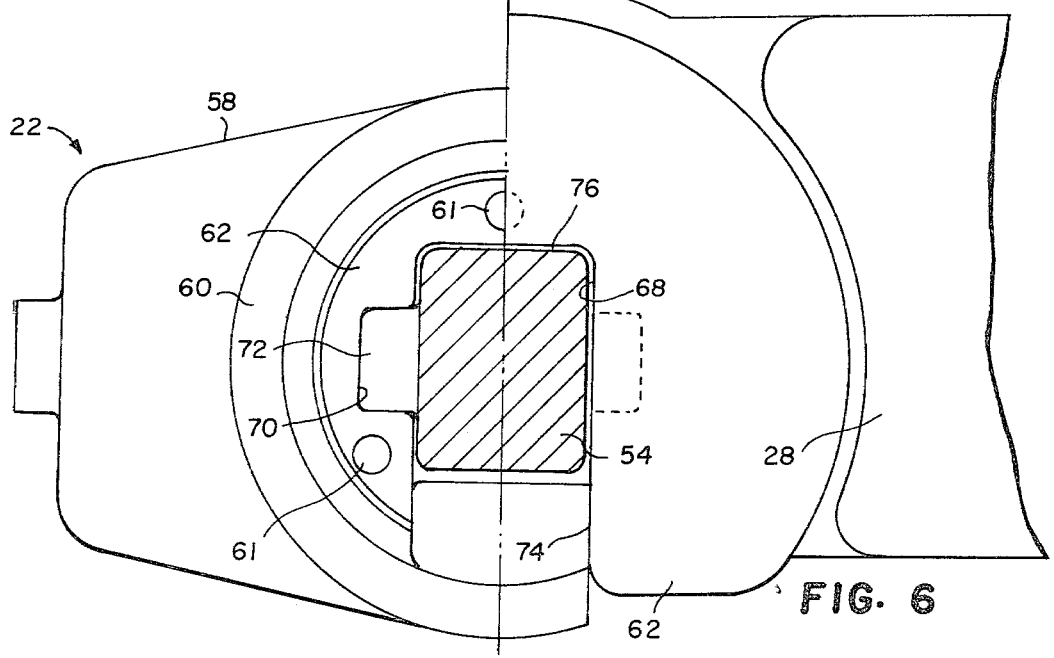
FIG. 6 is a view taken substantially from line 6—6 of FIG. 5 of only the fork andd retainer.

Referring to FIGS. 1 and 2 of the drawings, a preferred embodiment of the toy convertible load carrying-ride-on vehicle of this invention is shown as a load carrying vehicle 10 such as a wagon. In FIGS. 3, 6, the vehicle is shown converted to a ride-on vehicle 12. The vehicle ls 10, 12 comprise a body 14 mounted on a rear unit 16 consisting of a shaft 18 secured to the body upon which wheels 20 are rotatably mounted. The body 14 is further mounted on a pivotal front unit 22 which also supports a shaft 24 upon which wheels 20 are rotatably mounted. Instead of wheels, the rear and front units 16, 22 respectively can be mounted on slidable members such as runners, for example, not shown.

With reference to FIGS. 1 and 2, body 14 has a center portion having a substantially flat top surface 26, and front and rear bulwarks 28, 30 respectively extending above the flat top surface. The bulwarks 28, 30 have aligned openings 32 extending therethrough for receiving pivot pins 34 inserted through the openings and releasably held therein by detents 35 or the like. The body 14 further has an elongated side plate 36 of substantially L-shaped cross-section on each side. Each side plate 36 has blind bores 38 in each end thereof for receiving the ends of pins 34 inserted through openings 32. So mounted, each side plate 36 is pivotably movable on body 14 between box and seat positions now to be described.

In the box position, as best seen in FIGS. 1 and 2, the outer surface 40 of a leg 42 of each plate 36 rests on a peripheral rib 44 at each end of the center portion of body 14 (FIG. 3). The other leg 46 extends upwardly relative to top surface 26 to form a side of a box. The ends of the box are formed by the upstanding bulwarks 28, 30.

Figure 4:
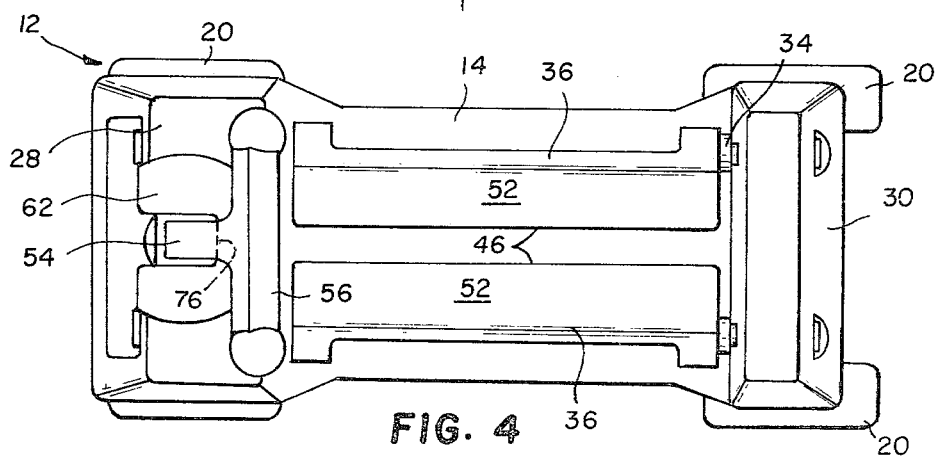
FIG. 4 is a top plan view of the vehicle of FIG. 3.

To obtain the seat position, as best seen in FIGS. 2, 3 and 4, each side plate 36 is rotated 180° from the box position. In this seat position, the outer end 48 of each leg 46 rests upon ribs 50 on top surface 26. The legs 46 of both side plates 36 are positioned in parallel, closely spaced relation, and the outer surfaces 52 of legs 42 form a flat seat surface.

The vehicles 10, 12 further have an elongated handle member comprising a tongue 54 having a handle 56 at one end thereof. The opposite end of tongue 54 is coupled to pivotal front unit 22 for movement between a pull position (FIG. 1) when the vehicle is a load carrying vehicle 10, and a steer position (FIG. 3) when the vehicle is a ride-on vehicle 12.

Figure 5:
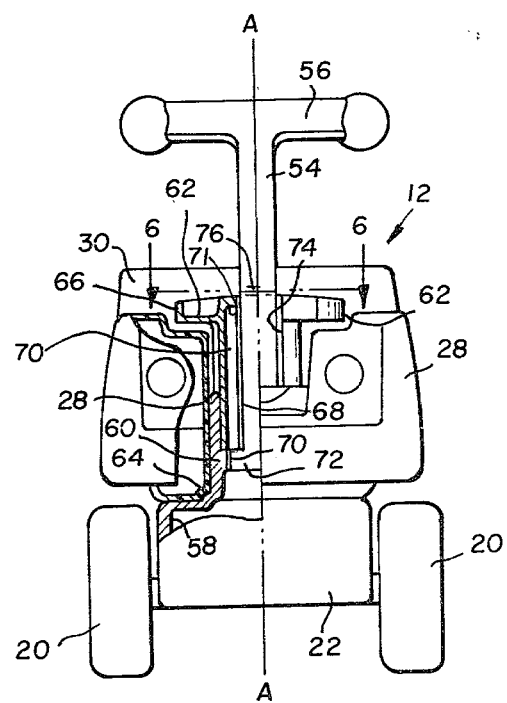
FIG. 5 is a front elevational view of the vehicle of FIG. 3 with a portion of the fork and retainer broken away and sectioned.

The pivotal front unit 22 as best seen in FIG. 5, comprises a fork 58 having an upstanding spindle 60 extending through an opening in front bulwark 28. Spindle 60 is secured by screws 61 or the like (FIG. 6) to a retainer 62, and the fork 58, spindle 60 and retainer 62 are all pivotal together as a unit. Axial movement of the unit is prevented in one direction by a shoulder 64 on spindle 60 engaging body 14, and in the other direction by a rim 66 on retainer 62 engaging the body.

The coupling between tongue 54 and front unit 22, as best seen in FIG. 5, comprises an axial bore or opening 68 extending through retainer 62 and spindle 60. The cross-section of opening 68 and tongue 54 are complementary (substantially rectangular, as best seen in FIG. 6) so that the free end portion of the tongue can slidably move up and down the opening. The opening 68 further has diametrically opposed elongated slots 70 on the inner periphery of the opening for slidably receiving laterally extending lugs 72 on the end of tongue 54. Retainer 62 further has a notch 74 at least along its upper end connected to opening 68 to allow pivotal movement of tongue 54 and handle 56 in a direction transverse to the axis A—A of opening 68 as best seen in FIG. 1 in solid lines.

When side plates 36 are moved to the box position to convert the vehicle to a load carrying vehicle 10, as seen in FIG. 1, tongue 54 and handle 56 are raised vertically until lugs 72 engage the upper ends 71 of slots 70 which form a stop for the handle members. The tongue 54 and handle 56 are then pivoted downwardly transverse to the axis of opening 68 into its pull position shown in full lines in FIG. 1 for pulling the load carrying vehicle 10.

When side plates 36 are moved to the seat position, to convert the vehicle to a ride-on vehicle 12, as seen in FIGS. 3, 4 and 5, tongue 54 and handle 56 are pivoted upwardly within notch 74 until the lower end of the tongue is in a vertical position in alignment with opening 68. Tongue 54 is slid downwardly until a curved surface 76 (FIGS. 4, 5 and 6) on the tongue engages an edge of retainer 62 to provide a stop for the handle member. In this steer position, tongue 54 and handle 56 are rigid with, or non-pivotal relative to, front unit 22, and the tongue and front unit are rotatable as a unit about axis A—A of opening 68 to steer vehicle 12. In this steer position, tongue 54 and handle 56 cannot be pivoted transverse to the axis A—A.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as full within the scope and spirit of the appended claims.

What is claimed is:

1. A toy convertible load carrying-ride on vehicle comprising in combination:
    a transportable body having a center body portion and a pivotal front unit having a substantially vertically extending bore and a radially extending notch connected to said bore at the upper end of said bore;
    side plates on said body movable between a box position, in which said plates cooperate with said body to form a box for converting the vehicle to a load carrying vehicle, and a seat position, in which said plates cooperate with said body to form a seat for converting the vehicle to a ride-on vehicle; and
    an elongated handle member coupled to said bore and said notch of said front unit for movement between a steer position for steering a ride-on vehicle, and a pull position for pulling a load carrying vehicle, said handle member having a handle on one end portion thereof and a tongue on the opposite end portion thereof, said tongue having coupling means on its free end portion, whereby when said handle member is moved into its steer position, said free end portion of said tongue slidably enters said bore and cooperates therewith for constraining movement of said handle member to pivotal movememt about the coincident axes of said bore and said free end portion of said tongue, and when said handle member is moved into its pull position, said coupling means on said tongue is coupled to said upper end of said bore allowing pivotal movement of said tongue into said notch with said axis of said free end portion of said tongue transverse to said axis of said bore.

2. A toy load carrying-ride on vehicle according to claim 1 wherein said bore has a substantially vertically extending groove along its inner periphery, and said coupling means comprises a laterally extending lug on said free end portion of said tongue slidably movable within said groove.

3. A toy load carring-ride on vehicle according to claim 2 wherein said groove terminates at the upper end of said bore to form a stop for said lug.

4. A toy load carrying-ride on vehicle according to claim 1 wherein said bore and said tongue have substantially rectangular cross-sections, and bore has substantially vertically extending grooves along opposite inner sides thereof, said coupling means comprises laterally extending lugs on opposite sides of said free end of said tongue slidably movable within said groove, and said grooves further terminate at the upper end of said bore to form stops for said lugs.

* * * * *